US012361638B2

(12) United States Patent
Motohashi et al.

(10) Patent No.: US 12,361,638 B2
(45) Date of Patent: Jul. 15, 2025

(54) THREE-DIMENSIONAL SHAPE GENERATION APPARATUS, THREE-DIMENSIONAL SHAPE GENERATION SYSTEM, THREE-DIMENSIONAL SHAPE GENERATION METHOD, AND NON-TRANSITORY RECORDING MEDIUM

(71) Applicants: Naoki Motohashi, Kanagawa (JP); Kagehiro Nagao, Kanagawa (JP)

(72) Inventors: Naoki Motohashi, Kanagawa (JP); Kagehiro Nagao, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 212 days.

(21) Appl. No.: 18/084,578

(22) Filed: Dec. 20, 2022

(65) Prior Publication Data
US 2023/0222730 A1    Jul. 13, 2023

(30) Foreign Application Priority Data

Jan. 13, 2022  (JP) ................................ 2022-003702
Oct. 25, 2022  (JP) ................................ 2022-170250

(51) Int. Cl.
*G06T 17/00* (2006.01)
(52) U.S. Cl.
CPC .......... *G06T 17/00* (2013.01); *G06T 2210/56* (2013.01)
(58) Field of Classification Search
CPC .................... G06T 17/00; G06T 2210/56
See application file for complete search history.

(56) References Cited

U.S. PATENT DOCUMENTS

| | | | | |
|---|---|---|---|---|
| 2009/0216358 A1* | 8/2009 | Hanamoto | ............. | G06F 30/00 700/98 |
| 2014/0067126 A1* | 3/2014 | Watanabe | ................ | G06T 7/75 382/103 |
| 2016/0147915 A1* | 5/2016 | Pope | ....................... | G06F 30/13 703/1 |
| 2016/0217225 A1 | 7/2016 | Bell et al. | | |
| 2016/0232259 A1 | 8/2016 | Williams et al. | | |
| 2017/0323035 A1* | 11/2017 | Hori | ..................... | G06V 30/422 |

FOREIGN PATENT DOCUMENTS

| | | |
|---|---|---|
| JP | 2014-115915 | 6/2014 |
| JP | 2019-056966 | 4/2019 |
| JP | 2019-192170 | 10/2019 |

(Continued)

OTHER PUBLICATIONS

Extended European Search Report issued Jun. 6, 2023 in European Patent Application No. 22212681.5, 10 pages.

*Primary Examiner* — Sing-Wai Wu
(74) *Attorney, Agent, or Firm* — XSENSUS LLP

(57) ABSTRACT

A three-dimensional shape generation apparatus includes circuitry configured to generate three-dimensional shape information indicating a three-dimensional shape corresponding to a three-dimensional point group based on multiple sets of model shape information set by a model setting operation and point-group information indicating the three-dimensional point group. The model setting operation received at a reception screen sets the multiple sets of model shape information each indicating a three-dimensional model shape.

19 Claims, 11 Drawing Sheets

(56) References Cited

FOREIGN PATENT DOCUMENTS

| JP | 2019-207477 | 12/2019 |
|---|---|---|
| JP | 2020-144686 | 9/2020 |
| JP | 2020-197979 | 12/2020 |
| JP | 2021-012133 | 2/2021 |
| JP | 2022-147012 | 10/2022 |
| JP | 2022-151477 | 10/2022 |

\* cited by examiner

THREE-DIMENSIONAL SHAPE
GENERATION SYSTEM 1

MANAGEMENT
SERVER 5

100

COMMUNICATION
NETWORK

TERMINAL DEVICE 3

FIG. 4

| USER ID | POINT GROUP DATA | PROCESSING HISTORY |
|---|---|---|
| 1 | XXXXXX XXXXXX XXXXXX | MM/DD/YY<br>·PROCESSING DETAILS:<br>REGISTRATION, NOISE REMOVAL, SEGMENTATION, MODELING<br>·SELECTIVE MODELS:<br>PIPING (MODEL A), DESK<br>MM/DD/YY<br>... |
| 2 | XXXXXX XXXXXX XXXXXX | MM/DD/YY<br>... |

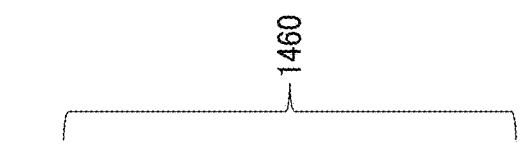
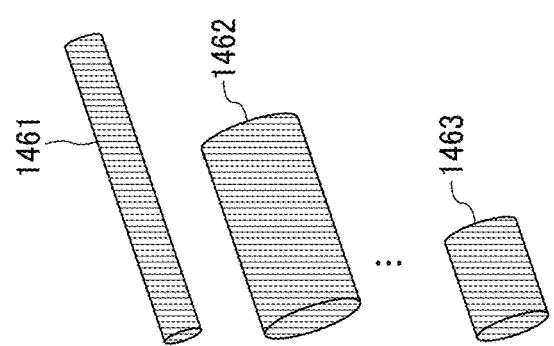
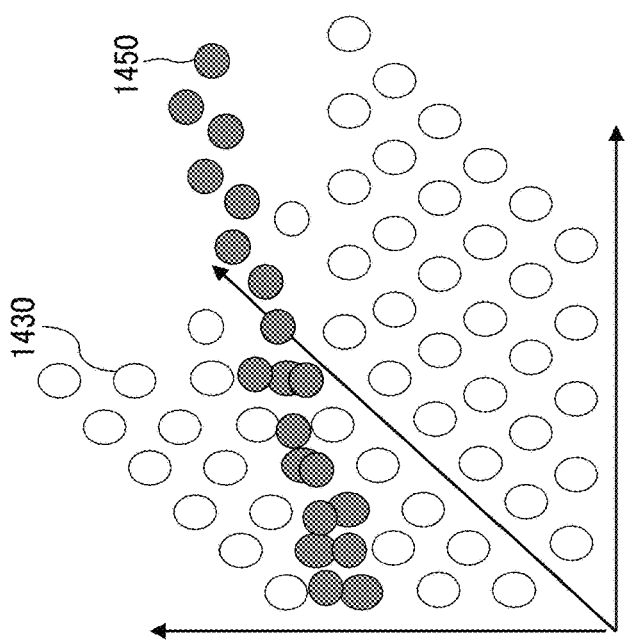

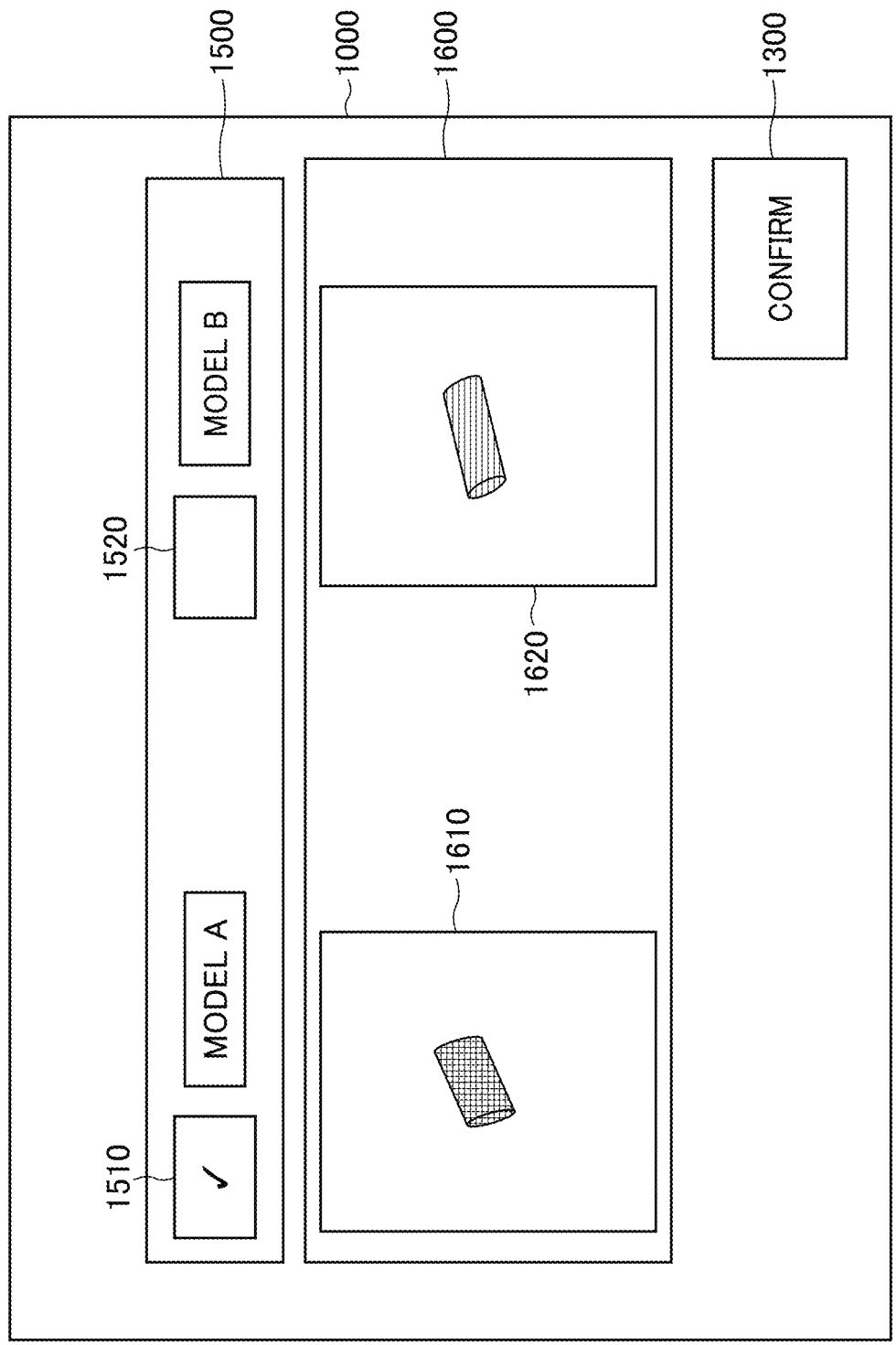

THREE-DIMENSIONAL SHAPE GENERATION APPARATUS, THREE-DIMENSIONAL SHAPE GENERATION SYSTEM, THREE-DIMENSIONAL SHAPE GENERATION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-003702, filed on Jan. 13, 2022 and Japanese Patent Application No. 2022-170250, filed on Oct. 25, 2022 in the Japan Patent Office, the entire disclosure of which are hereby incorporated by reference herein.

BACKGROUND

Technical Field

The present disclosure relates to a three-dimensional shape generation apparatus, a three-dimensional shape generation system, a three-dimensional shape generation method, and a non-transitory recording medium.

Related Art

A three-dimensional model generation apparatus has been developed to generate a three-dimensional model having at least an outer shape of an object based on three-dimensional point group data of the object. The three-dimensional model generation apparatus includes an abstraction three-dimensional model acquisition unit and a three-dimensional model determination unit. The abstraction three-dimensional model acquisition unit acquires an abstraction three-dimensional model, whose dimension is changeable and which has an outer shape corresponding to each outer shape of the object. The three-dimensional model determination unit determines a matching degree between the three-dimensional point group data and the abstraction three-dimensional model while changing the dimension of the abstraction three-dimensional model and determines, as the three-dimensional model, an abstraction three-dimensional model having a high matching degree.

SUMMARY

An embodiment of the present disclosure provides a three-dimensional shape generation includes circuitry configured to generate three-dimensional shape information indicating a three-dimensional shape corresponding to a three-dimensional point group based on multiple sets of model shape information set by a model setting operation and point-group information indicating the three-dimensional point group. The model setting operation received at a reception screen sets the multiple sets of model shape information each indicating a three-dimensional model shape.

Further, an embodiment of the present disclosure provides a three-dimensional shape generating method including: generating a reception screen to receive a model setting operation to set multiple sets of model shape information each indicating a three-dimensional model shape; and generating three-dimensional shape information indicating a three-dimensional shape corresponding to a three-dimensional point group based on the multiple sets of model shape information set by the model setting operation and point-group information indicating the three-dimensional point group.

Still further, an embodiment of the present disclosure provides a three-dimensional shape generation system including: a three-dimensional shape generation apparatus including first circuitry; a communication terminal including second circuitry. The communication terminal is communicable with the three-dimensional shape generation apparatus. The first circuitry is configured to: transmit reception screen information indicating a reception screen to the communication terminal. The second circuitry is configured to: display the reception screen, to receive a model setting operation, based on the reception screen information transmitted to the communication terminal; and receive the model setting operation to set multiple sets of model shape information each indicating a three-dimensional model shape. The first circuitry is further configured to: generate three-dimensional information indicating a three-dimensional shape corresponding to a three-dimensional point group based on the multiple sets of model shape information set by the model setting operation and point-group information indicating the three-dimensional point group.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a conceptual diagram of a setting information management table according to an embodiment of the present disclosure;

FIGS. 11A, 11B, and 11C are illustrations of a model collation and replacement process according to an embodiment of the present disclosure; and FIG. 12 is an illustration of an operation screen according to an embodiment of the present disclosure.

Figure 1:
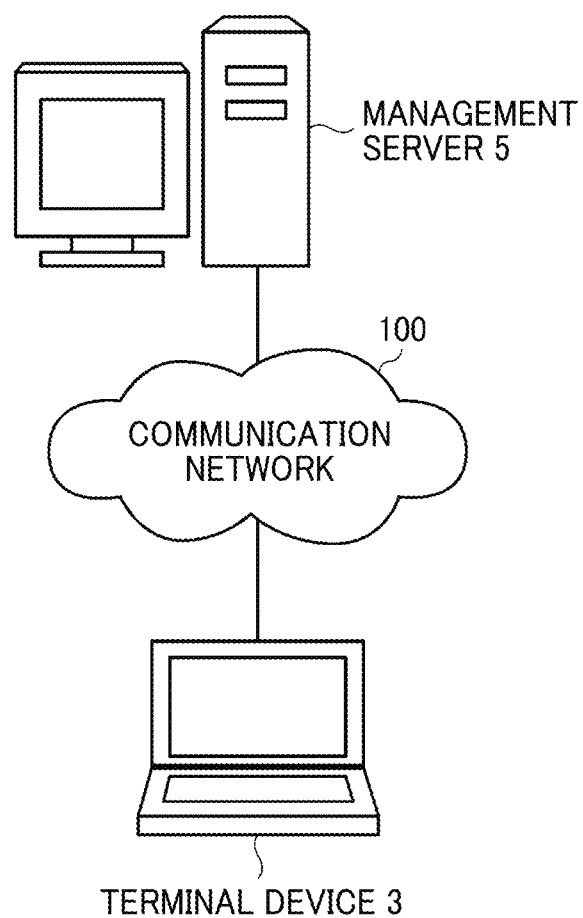
FIG. 1 is a schematic diagram of an overview of a three-dimensional shape generation system according to an embodiment of the present disclosure.

The accompanying drawings are intended to depict embodiments of the present invention and should not be interpreted to limit the scope thereof. The accompanying drawings are not to be considered as drawn to scale unless

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure enables generation of three-dimensional shape information for three-dimensional point groups.

Building information modeling (BIM) and construction information modeling (CIM) have been developed in industries such as civil engineering and construction to deal with declining birthrate and a growing proportion of elderly people and increases increase labor productivity.

BIM is an abbreviation of Building Information Modeling, which is a solution for utilizing information in all processes from the design and construction to the maintenance and management of the building, the information involving database of the building in which attribute information such as cost, finish, and management information is added to a three-dimensional digital model (hereinafter referred to as a 3D model) of buildings created on a computer.

The CIM is an abbreviation of Construction Information Modeling, which is a solution for the civil engineering field (general infrastructure such as roads, electric power, gas, and water) proposed in conformity with the BIM advanced in the building field. Similarly to the BIM, the CIM is a process to enhance the efficiency and sophistication of a series of construction production system by sharing information, particularly 3D model, among persons concerned.

What is important in promoting BIM and CIM is how to easily construct 3D models of buildings and public facilities.

In newly constructing a building, a to-be-completed building can be modeled from scratch using 3D computer aided design (CAD), which means that the BIM and CIM is comparatively easy to achieve. However, for exiting buildings, the original design drawing at the time when the building was built may not remain or may differ from the original design drawing because of modification, meaning that the BIM and CIM is difficult to achieve. The BIM of such exiting buildings is referred to as conversion of the existing building into the BIM is performed by As-Build BIM, which is a significant challenge for promoting the BIM and CIM in the future.

The As-Build BIM involves a workflow of measuring a space using a laser scanner (LS) and creating a CAD model from a measured point group. Classical As-Build BIM involves measuring a space with a picture and a measure and sketching and reproducing the space. This causes a significant operation cost, but has greatly improved the operating efficiency by using the LS.

The As-Build BIM using the LS has facilitated modeling data, but involves processing point groups, which was not included in workflow of the classical As-Build BIM. The typical point-group processing involves measuring multiple points using the LS, positioning each point group, forming an integrated point group, removing from the integrated point group an unnecessary point such as noise, and finally converting the point group into a CAD model.

These processes are performed using an automatic model creation function of commercially available point-group processing software. The commercially available point-group processing software, however, may cause less accuracy and take a longer processing time when collectively generating three-dimensional shapes of objects of different categories such as a pipe, a desk, and a person in the same space, that is, in the same point cloud.

When generating a three-dimensional shape of an object in a single category, such point-group processing software involves repeating the process of generating the three-dimensional shape for the number of categories.

In view of the above-described circumstances, embodiments of the present disclosure enable an appropriate generation of a three-dimensional shape with accuracy desired by the user, without taking undue processing time or effort.

FIG. 1 is a diagram of an overview of a three-dimensional shape generation system 1 according to an embodiment of the present disclosure. The three-dimensional shape generation system 1 according to an embodiment of the present disclosure includes a terminal device 3 serving as a communication terminal and a management server 5.

The management server 5, which serves as a three-dimensional shape generation apparatus, generates a three-dimensional shape information (information on a three-dimensional shape) indicating a three-dimensional shape corresponding to a three-dimensional point group using model shape information representing a three-dimensional model shape.

In the present disclosure, the three-dimensional point group refers to a set of coordinate points in a virtual three-dimensional space, which can be manipulated by computers. The three-dimensional point group may be referred to as a point cloud. The three-dimensional point group is a set of coordinate points corresponding to measurement points on a surface of an object when a space in which the object is present is measured using the LS or another tool. Color information may be added to each coordinate point, and red, green, and blue (RGB) values of each coordinate point may be added as the color information.

Although an example in which the three-dimensional point group is measured using the LS has been described, other optical measure or mechanical measure may be used. Examples of the optical measure include a method using a stereo camera and a method using visual simultaneous localization and mapping (SLAM).

The three-dimensional shape information represents a three-dimensional shape of an object that can be manipulated by a computer or other devices. The information indicating the three-dimensional shape enables geometrically identifying of the three-dimensional shape. For a sphere, for example, the coordinates of the center and the radius of the object correspond to information indicating the three-dimensional shape. When the three-dimensional shape of an object is represented by a polyhedron (polygon), the coordinate points of vertices of the polyhedron correspond to information indicating the three-dimensional shape. In another example, information representing the three-dimensional shape may be any information that uniquely defines the shape of the object.

The three-dimensional information may include information on color or material of the object, in addition to information indicating the three-dimensional shape of the object.

The three-dimensional model shape refers to a model such as a form and a template used for generating three-dimensional shape information from a three-dimensional point group. The model shape information refers to information indicating a three-dimensional model shape, in which one set of model shape information corresponds to one three-dimensional model shape.

In some examples, the model shape information includes information relating to color or material of the three-dimensional model (additional information), in addition to the three-dimensional shape. Specifically, a three-dimensional model shape indicating a plane is provided with information indicating texture such as a color or a pattern of a wall or information on a material.

The three-dimensional model shape including texture information facilitates expression of a CAD model colored or patterned. Further, the three-dimensional model shape including material information allows a CAD model, to which material information can be provided, to have the material information as is and thus eliminates the user's trouble of setting.

The "texture" originally indicates the texture or touch of the surface of an object, and the "texture" in the three-dimensional shape information indicates a pattern or an image to be attached to the surface of the three-dimensional shape in order to express the texture of the surface of the object.

CAD models typically includes a surface CAD model, a solid CAD model, and a polygon CAD model. The solid CAD model has appearance information and information on material content and thus allows calculation of mass and volume and expression of a cross-sectional shape. The solid CAD model can express an actual object most realistically.

Setting color, material, brightness, and scene on a CAD model is referred to as rendering, which creates a beautiful image that looks like a picture.

The terminal device 3 and the management server 5 are communicable with each other via a communication network 100. The communication network 100 is configured by the Internet, a mobile communication network, and a local area network (LAN). The communication network 100 may include networks based on wired communication and networks based on wireless communication such as 3rd generation (3G), worldwide interoperability for microwave access (WiMAX), and long term evolution (LTE). The terminal device 3 communicates by a short-range communication technology such as near field communication (NFC) (registered trademark).

Hardware Configuration

Figure 2:
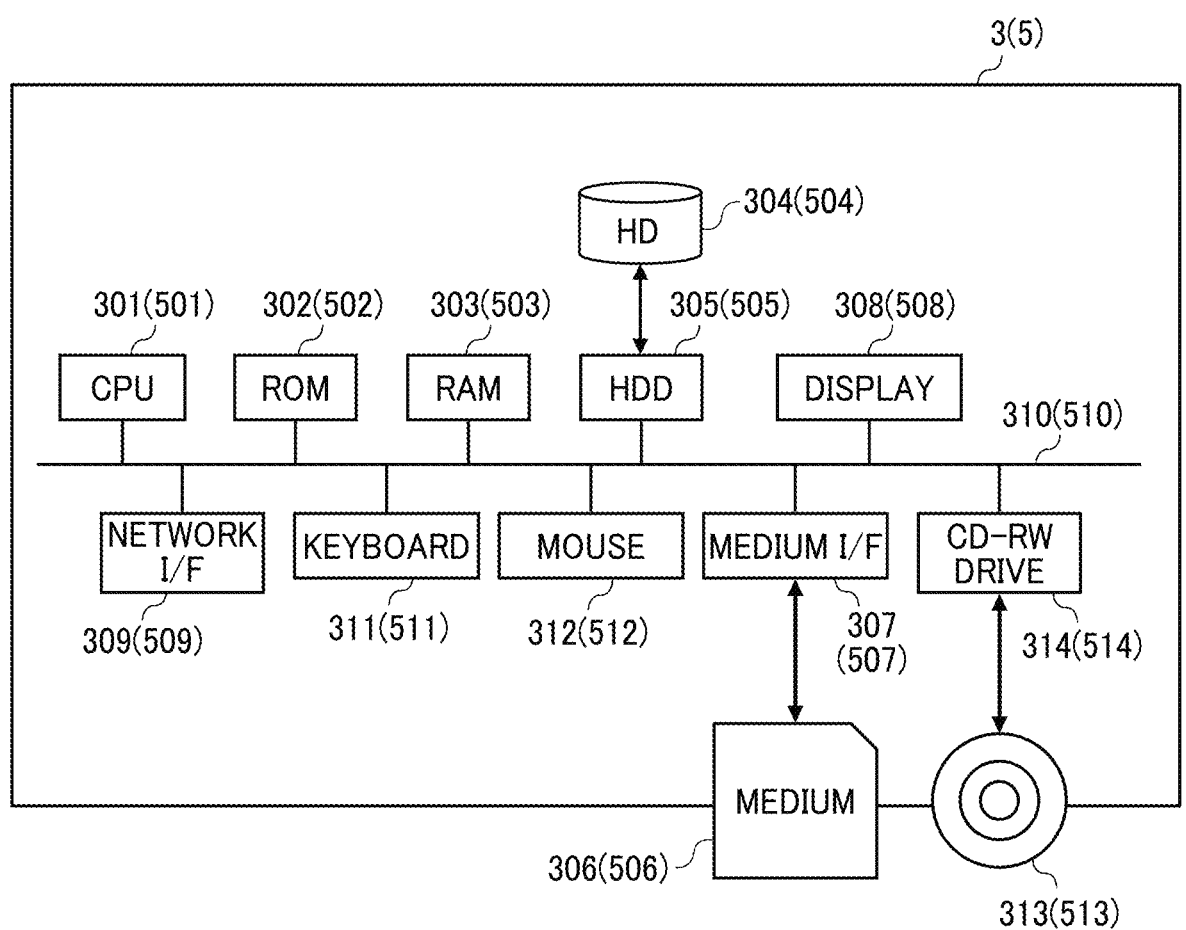
FIG. 2 is a hardware block diagram of a terminal device and a management server according to an embodiment of the present disclosure.

FIG. 2 is a hardware block diagram of a terminal device 3 and a management server 5 according to an embodiment of the present disclosure. In FIG. 2, the hardware components 301 to 314 are hardware elements of the terminal device 3. The hardware components 501 to 514 are hardware elements of the management server 5.

The terminal device 3 includes a central processing unit (CPU) 301, a read only memory (ROM) 302, a random access memory (RAM) 303, a hard disk (HD) 304, a hard disk drive (HDD) 305, a recording medium 306, a medium interface (I/F) 307, a display 308, a network interface (I/F) 309, a keyboard 311, a mouse 312, a compact disc-rewritable (CD-RW) drive 314, and a bus line 310.

The CPU 301 controls the entire operation of the terminal device 3. The ROM 302 stores a control program for operating the CPU 301. The RAM 303 is used as a work area for the CPU 301. The HD 304 stores various data such as programs. The HDD 305 controls reading or writing of various data to or from the HD 304 under control of the CPU 701. The medium I/F 307 controls reading or writing (storing) of data from or to a storage medium 306 such as a flash memory. The display 308 displays various information such as a cursor, a menu, a window, characters, or an image. The network I/F 309 is an interface that controls communication of data through the communication network 100. The keyboard 311 serves as an input device provided with multiple keys that allow a user to input characters, numerals, or various instructions. The mouse 312 serves as an input device that allows the user to select specific instructions, select a target object to be processed or executed, or move a curser being displayed. The CD-RW drive 314, which serves as a removable storage medium, controls reading and writing of various data from and to a CD-RW 513.

The management server 5 includes a CPU 501, a ROM 502, a RAM 503, a HD 504, a HDD 505, a recording medium 506, a medium I/F 507, a display 508, a network I/F 509, a keyboard 511, a mouse 512, a CD-RW drive 514, and a bus line 510. The CPU 501 serves as circuitry or a processor of the management server 5. Since these components have similar configurations to the above-described components (the CPU 301, ROM 302, RAM 303, HD 304, HDD 305, recording medium 306, medium I/F 307, display 308, network I/F 309, keyboard 311, mouse 312, CD-RW drive 314, and bus line 310), description thereof will be omitted.

Instead of the CD-RW drives 314 and 514, CD-R drives may be used. In one example, each of the terminal device 3 and the management server 5 is configured as a single computer. In another example, each of the terminal device 3 and the management server 5 is configured as multiple computers to which any one or more units (functions, means, or storages) are allocated. In other words, each of the terminal device 3 and the management server 5 can be implemented by multiple servers that operate in cooperation with one another.

Figure 3:
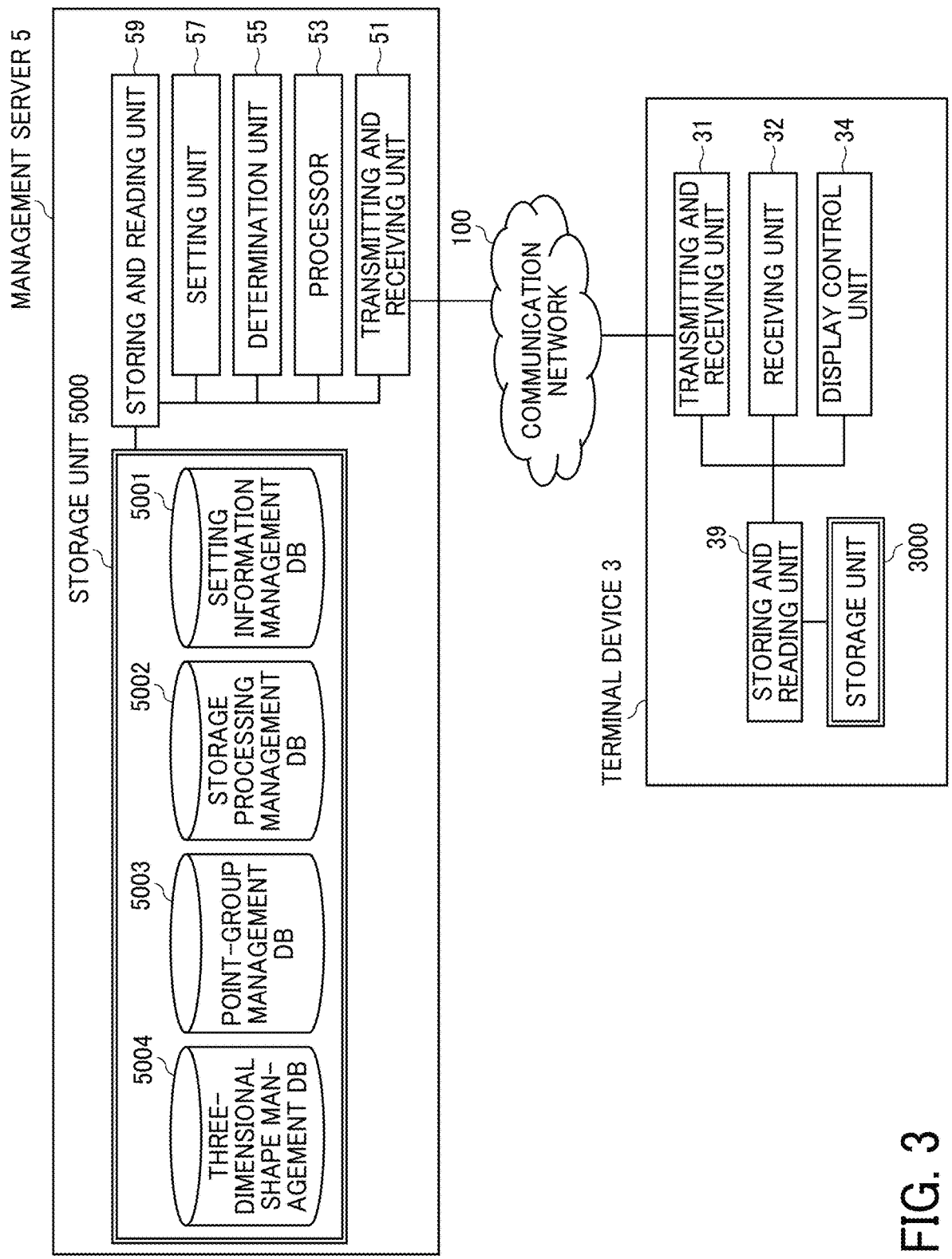
FIG. 3 is a functional block diagram of a three-dimensional shape generation system in FIG. 1.

FIG. 3 is a functional block diagram of a three-dimensional shape generation system 1 in FIG. 1.

As illustrated in FIG. 3, the terminal device 3 includes a transmitting and receiving unit 31, a receiving unit 32, a display control unit 34, and a storing and reading unit 39. These units are functions that are implemented by or that are caused to function by operating any of the hardware components illustrated in FIG. 2 in cooperation with the instructions of the CPU 301 according to the control program expanded from the HD 304 to the RAM 303. The terminal device 3 further includes a storage unit 3000 implemented by the RAM 303 and HD 304 in FIG. 2.

Functional Configuration of Terminal Device

The components of the terminal device 3 are described below.

The transmitting and receiving unit 31 serving as a transmitter, which is implemented by instructions of the CPU 301 and by the network I/F 309 in FIG. 2, transmits or receives various types of data (or information) to or from other terminal, device, apparatus, or system through the communication network 100.

The receiving unit 32 serves as a receiver, which is implemented by instructions of the CPU 301 FIG. 2 and by the keyboard 311 and the mouse 312. The receiving unit 32 receives various inputs from the user.

The display control unit 34 serves as a display controller, which is implemented by a command from the CPU 301 in FIG. 2. The display control unit 34 causes the display 308 serving as a display unit to display various images or a screen.

The storing and reading unit 39 serves as a storage controller, which is implemented by instructions from the CPU 301 in FIG. 2 and by the HDD 305, the medium I/F 307, and the CD-RW drive 314. The storing and reading unit 39 stores various data in the storage unit 3000, the recording medium 306, and the CD-RW 313, and reads the various data from the storage unit 3000, the recording medium 306, and the CD-RW 313.

Functional Configuration of Management Server

The management server 5 includes a transmitting and receiving unit 51, a processor 53, a determination unit 55, a setting unit 57, and a storing and reading unit 59. These units are functions or means implemented by or caused to function by operating one or more hardware components illustrated in FIG. 2 in cooperation with instructions of the CPU 501 according to the program loaded from the HD 504 to the RAM 503. The management server includes a storage unit 5000 configured by the HD 504 in FIG. 2. The storage unit 5000 serves as a storage unit.

Functional Configuration of Management Server

The components of the management server 5 are described below. The management server 5 may be configured as multiple computers to which any one or more units (functions, means, or storages) are allocated. The description is given of an example in which the management server 5 is a server computer that resides in a cloud environment. In another example, the management server 5 is a server that resides in an on-premises environment.

The transmitting and receiving unit 51 serving as a transmitter, which is implemented by instructions of the CPU 501 and by the network I/F 509 in FIG. 2, transmits or receives various types of data (or information) to or from other terminal, device, apparatus, or system through the communication network 100.

The processor 53, which is implemented by instructions of the CPU 501 in FIG. 2, serves to perform various processes to be described below. The processor 53 serves as a three-dimensional information generation unit that generates three-dimensional shape information.

The determination unit 55, which is implemented by instructions of the CPU 501 in FIG. 2, serves to perform various determinations to be described below.

The setting unit 57, which is implemented by instructions of the CPU 501 in FIG. 2, serves to perform various settings and determinations to be described below.

The storing and reading unit 59 serves as a storage controller, which is implemented by instructions from the CPU 501 in FIG. 2 and by the HDD 505, the medium I/F 507, and the CD-RW drive 514. The storing and reading unit 59 stores various data in the storage unit 5000, the recording medium 506, and the CD-RW 513, and reads the various data from the storage unit 5000, the recording medium 506, and the CD-RW 513. The storage unit 5000, the recording medium 506, and the CD-RW 513 serve as a storage unit.

The storage unit 5000 stores a setting information management database (DB) 5001, which is implemented by a setting information management table, a storage processing management DB 5002, a point-group management DB 5003, and a three-dimensional shape management DB 5004.

The setting information management DB 5001 stores and manages various types of information. The storage processing management DB 5002 stores and manages various processing programs for generating a three-dimensional shape. The point-group management DB 5003 stores and manages three-dimensional point group information for generating a three-dimensional shape. The three-dimensional shape management DB 5004 stores and manages three-dimensional shape information.

FIG. 4 is a conceptual diagram of a setting information management table according to an embodiment of the present disclosure.

The setting information management table is a table for managing three-dimensional point group data used to generate a three-dimensional shape and a history (or a processing history) of a process for generating the three-dimensional shape. The storage unit 5000 includes the setting information management DB 5001 configured by such as the setting information management table as illustrated in FIG. 4. The storage unit 5000 stores model shape information corresponding to one set of three-dimensional shape information determined by the processor 53 in the storage unit 5000.

Figure 5:
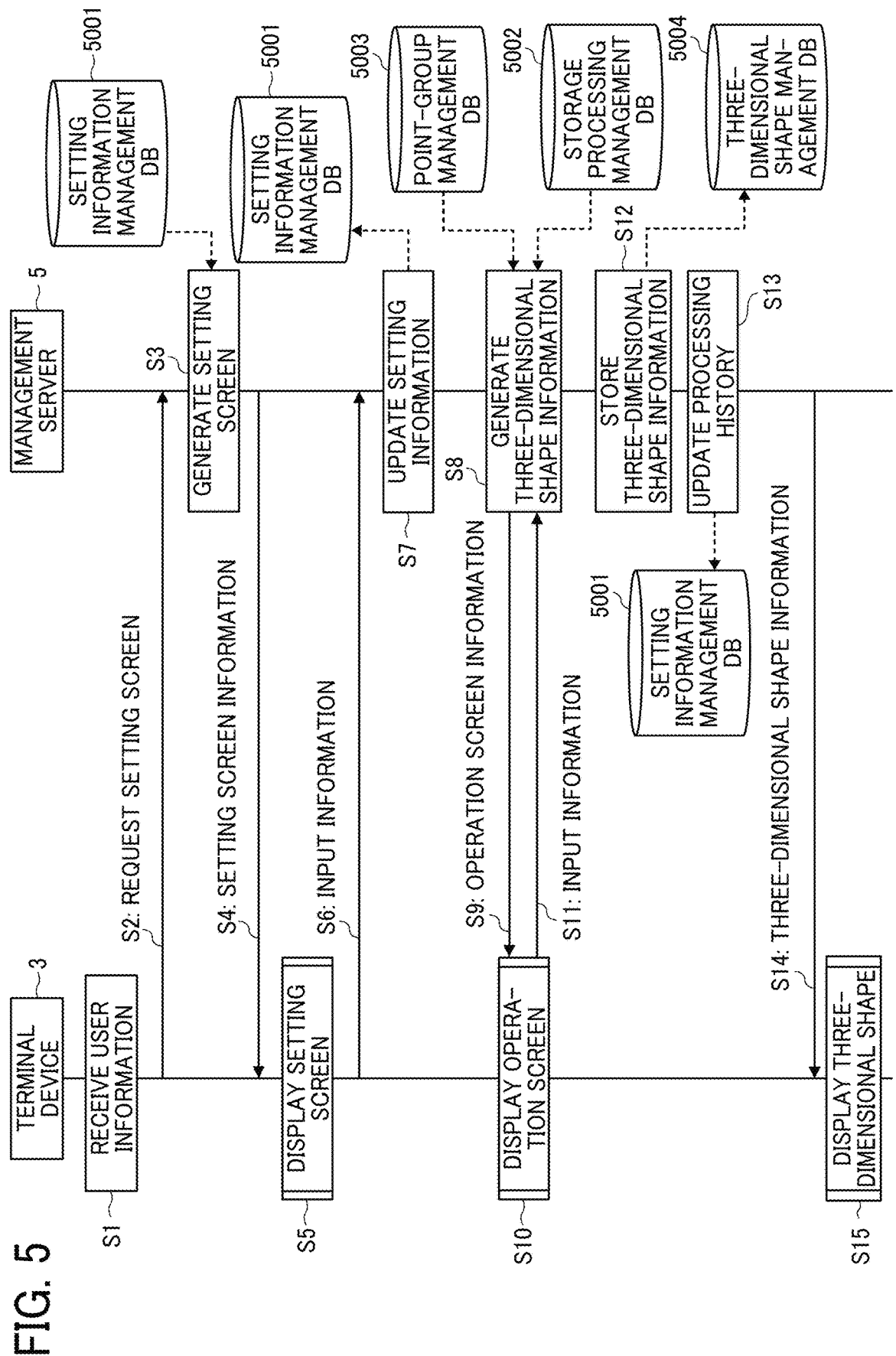
FIG. 5 is a sequence diagram of a three-dimensional shape generation process according to an embodiment of the present disclosure.

FIG. 5 is a sequence diagram of a three-dimensional shape generation process according to an embodiment of the present disclosure.

The receiving unit 32 of the terminal device 3 serving as a communication terminal receives an operation relating to user information of the user, which is input to the input/output screen displayed on the display 308 (step S1). The transmitting and receiving unit 31 of the communication terminal (the terminal device 3) transmits a request for a setting screen including the user information received in step S1 to the management server 5. The transmitting and receiving unit 51 of the management server 5 receives the request transmitted from the communication terminal (step S2).

The storing and reading unit 59 of the management server 5 searches the setting information management DB 5001 using a search key that is the user information included in the request received in step S2, and reads a file name of a three-dimensional point group data relating to the user information included in the request and a history of a process of generating a three-dimensional shape of the three-dimensional point group data. The setting unit 57 of the management server 5 generates a setting screen based on the file name and the history read out by the storing and reading unit 59 (step S3).

The setting screen includes a model information setting screen, a point-group setting screen, and a processing setting screen. The model information setting screen receives a model setting operation for setting or selecting more than one set of model shape information from multiple sets of model shape information. The point-group setting screen receives a point-group setting operation for setting a three-dimensional point group used to generate three-dimensional shape information. The processing setting screen receives a processing setting operation for setting processing program to generate three-dimensional shape information.

The process setting screen includes a display that is initially set based on the history read by the storing and reading unit 59.

The transmitting and receiving unit 51 transmits setting screen information relating to the setting screen generated in step S3 to the communication terminal (the terminal device 3). The transmitting and receiving unit 31 of the communication terminal (the terminal device 3) receives the setting screen information transmitted from the management server 5 (step S4). Step S4 is a transmitting step of transmitting model information setting screen information relating to the model information setting screen. The transmitting and receiving unit 31 serves as a transmitter.

The display control unit 34 of the communication terminal (terminal device 3) causes the display 308 to display the setting screen received in step S4 (step S5). The receiving unit 32 of the communication terminal (the terminal device 3) receives a predetermined input operation for the displayed setting screen, from the user. The predetermined input operation is set by the user in advance. The input operation includes the point-group setting operation, the processing setting operation, and the model setting operation for setting or selecting more than one set of model shape information from multiple sets of model shape information to generate three-dimensional shape information. Step S5 is a receiving step of receiving the model setting operation for setting or selecting more than one set of model shape information from multiple sets of model shape information to generate three-dimensional shape information.

The transmitting and receiving unit 31 transmits input information relating to the input operation received by the receiving unit 32 to the management server 5. The transmitting and receiving unit 51 of the management server 5 receives the input information (e.g., model setting information relating to a model setting operation) transmitted from the communication terminal (the terminal device 3) (step S6). The input information includes point-group setting operation, processing setting operation, and the model setting information relating to the model setting operation for setting or selecting one or more set of model shape information from multiple sets of model shape information, used to generate three-dimensional shape information.

The storing and reading unit 59 of the management server 5 updates the history of the process of generating the three-dimensional shape stored in association with the user information in the setting information management DB 5001, based on the processing setting information and model setting information included in the input information received in step S6 (step S7).

The storing and reading unit 59 searches the point-group management DB 5003 using the point-group setting information included in the input information received in step S6 as a search key, so as to read three-dimensional point group data associated with the point-group setting information. The storing and reading unit 59 searches the storage processing management DB 5002 using the processing setting information included in the input information received in step S6 as a search key, so as to read processing program associated with the processing setting information. The processor 53 of the management server 5 generates three-dimensional shape information based on the three-dimensional point-group data and processing program read by the storing and reading unit 59 and the model setting information included in the input information received in step S6 (step S8).

Figure 6:
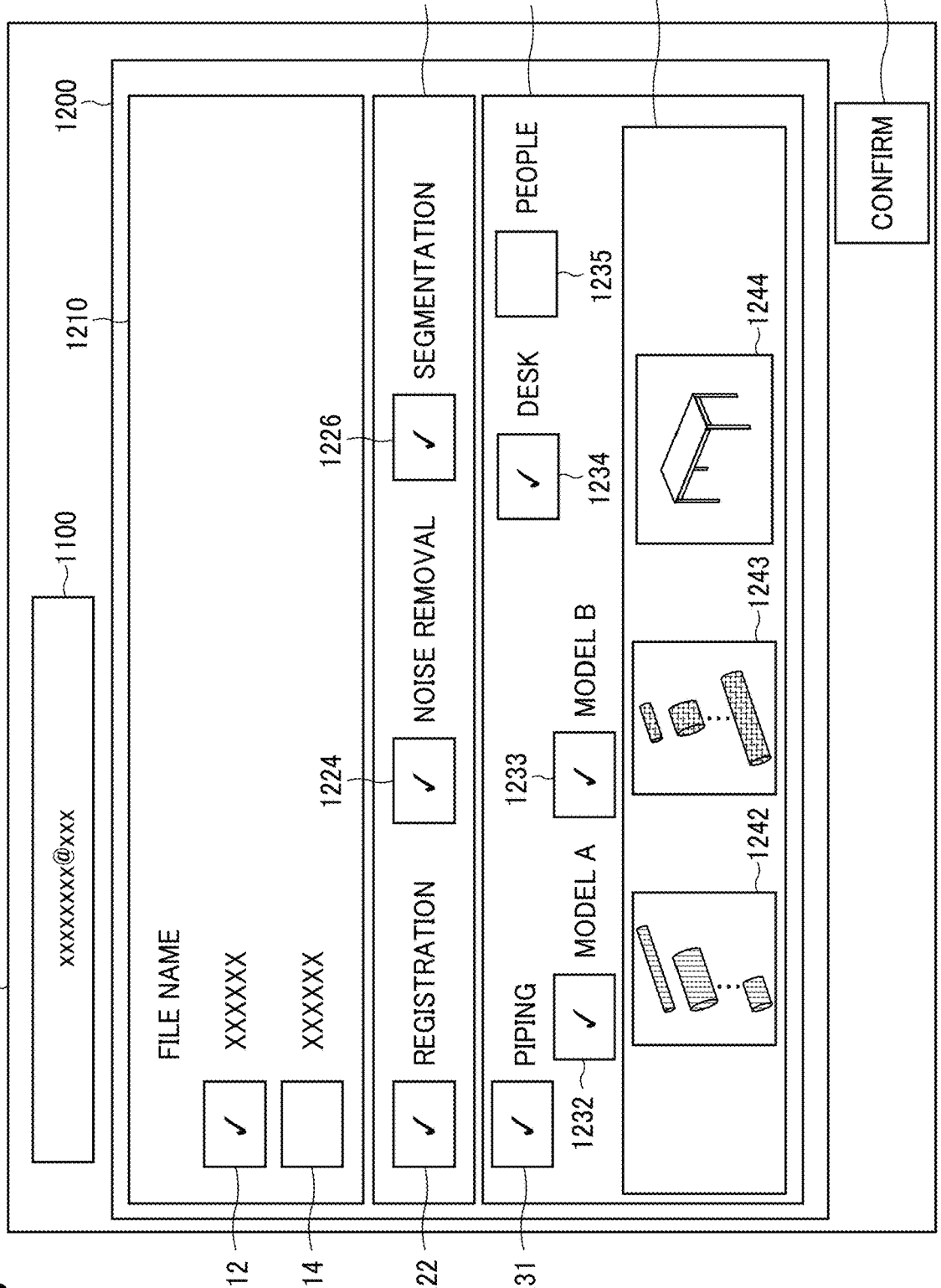
FIG. 6 is an illustration of a display screen according to an embodiment of the present disclosure.

Step S8 is a step of generating three-dimensional information, which generates three-dimensional shape information using more than one set of model shape information selected by the model setting operation, based on the model setting operation on the model information setting screen 1230 in FIG. 6 and the point group information indicating a three-dimensional point group.

The setting unit 57 of the management server 5 generates the operation screen that receives an input operation for generating the three-dimensional shape information. The transmitting and receiving unit 51 transmits operation screen information relating to the operation screen to the communication terminal (the terminal device 3) (step S9).

The transmitting and receiving unit 31 of the communication terminal (the terminal device 3) receives the operation screen information transmitted from the management server 5. The display control unit 34 of the communication terminal causes the display 308 to display the operation screen received from the management server 5. The receiving unit 32 of the communication terminal receives a predetermined input operation input from the user to the displayed operation screen (step S10).

The input operation includes a shape setting operation for setting one piece of three-dimensional shape information from multiple sets of three-dimensional shape information.

The transmitting and receiving unit 31 transmits input information relating to the input operation received by the receiving unit 32 to the management server 5. The transmitting and receiving unit 51 of the management server 5 receives the input information transmitted from the communication terminal (the terminal device 3) (step S11).

The input information includes the shape setting information used for the shape setting operation. The processor 53 of the management server 5 determines the three-dimensional shape information based on the shape setting information included in the input information received in step S11.

The communication terminal (the terminal device 3) and the management server 5 repeatedly execute steps S8 to S11 as appropriate.

The processor 53 converts the generated three-dimensional shape information into CAD format. The storing and reading unit 59 stores the converted three-dimensional shape information in the three-dimensional shape management DB 5004, the recording medium 506, or the CD-RW 513 (step S12). The CAD format is three-dimensional shape information that can be manipulated by the 3D CAD. The three-dimensional shape information is converted into 3D CAD format when manipulated with a commercially available 3D CAD.

The storing and reading unit 59 updates the history of the process of generating the three-dimensional shape stored in association with the user information in the setting information management DB 5001, based on the model shape information corresponding to the determined three-dimensional shape information (step S13).

The transmitting and receiving unit 51 transmits the determined three-dimensional shape information to the communication terminal (the terminal device 3) (step S14).

The transmitting and receiving unit 31 of the communication terminal (the terminal device 3) receives the three-dimensional shape information transmitted from the management server 5, and the display control unit 34 of the communication terminal causes the display 308 to display the received three-dimensional shape (step S15).

FIG. 6 is an illustration of a display screen according to an embodiment of the present disclosure.

FIG. 6 illustrates a display screen 1000 displayed on the display 308 of the terminal device 3 in step S5 of the sequence diagram in FIG. 5.

The display control unit 34 of the communication terminal causes the display 308 to display a user information display screen 1100, a setting screen 1200, and a confirmation key 1300 serving as an instruction reception screen on the display screen 1000.

The setting screen 1200 includes a point-group setting screen 1210, a processing setting screen 1220, and a model information setting screen 1230 as a reception screen.

The point-group setting screen 1210 is a screen that receives a point-group setting operation for setting point-group information indicating a three-dimensional point group used to generate three-dimensional shape information. The display control unit 34 causes the display 308 to display point-group setting boxes 1212 and 1214 on the point-group setting screen 1210, which are associated with the file names of multiple sets of point group data read by the storage and reading unit 59. For the point-group setting box, multiple point-group setting boxes (i.e., additional point-group setting boxes in addition to the point-group setting boxes 1212 and 1214) may be set.

The processing setting screen 1220 is a screen that receives a processing setting operation for setting processing program to generate three-dimensional shape information. The display control unit 34 causes processing setting boxes 1222, 1224, and 1226 to be displayed in association with the names of multiple processes.

In FIG. 6, the processing setting box 1222 is used to set processing program relating to registration. The processing setting box 1224 is used to set processing program relating to noise removal. The processing setting box 1226 is used to set processing program relating to segmentation. Details of these processing programs will be described later. In the present disclosure, the processing setting box 1222 relating to registration may be automatically set when multiple point groups are set on the point-group setting screen 1210. In one example, the processing setting box 1226 relating to segmentation may be excluded when processing relating to segmentation is performed without exception.

The display control unit 34 initially sets the settings of the processing setting boxes 1222, 1224, and 1226 based on the history read by the storing and reading unit 59 and displays the initial settings. If no history is present, a predetermined setting is displayed as an initial setting.

The model information setting screen 1230 is an example of a reception screen that receives the model setting operation for setting or selecting more than one set of model shape information from multiple sets of model shape information to generate three-dimensional shape information.

The model information setting screen 1230 includes model information setting boxes 1231, 1234, and 1235, model candidate setting boxes 1232 and 1233, and a model display screen 1240.

The display control unit 34 causes the model information setting boxes 1231, 1234, and 1235 to be displayed in association with the names of multiple sets of model information, and causes the model candidate setting boxes 1232 and 1233 to be displayed in association with the names of multiple model shapes. In the present disclosure, the model information indicates a group of model shape information including one or more sets of model shape information.

In FIG. 6, a model information setting box 1231 is used to set model information indicating a three-dimensional model shape of piping. The model information setting box 1234 is used to set model information indicating a three-dimensional model shape of desk. The model information setting box 1235 is used to set model information indicating a three-dimensional shape of person.

The model candidate setting box 1232 is used to set model shape information indicating a three-dimensional model shape of model A of piping. The model shape setting box (the model candidate setting box 1233) is used to set model shape information indicating a three-dimensional model shape of model B of piping.

The display control unit 34 causes the model display screen 1240 to display model candidates 1242, 1243 or a model shape 1244 in association with the names of the model information or model candidates set. When color is included in the model shape information, the model shape information may be displayed in color. In the present disclosure, multiple model candidates include three-dimensional model shapes different from each other, which are used to generate multiple sets of three-dimensional shape information for the same region in the three-dimensional point group. The generated multiple three-dimensional shape information is to be determined as one set of three-dimensional shape information in the subsequent process.

A model candidate 1242 indicates multiple three-dimensional model shape of model A for piping. A model candidate 1243 indicates multiple three-dimensional model shape of model B for piping. The model shape 1244 indicates the three-dimensional shape of desk.

In response to receiving a selection input from the user by the receiving unit 32 of the communication terminal (the terminal device 3) (i.e., the user's pointing at any of different setting boxes with a pointing device such as the mouse 312), the display control unit 34 causes the display 308 to display a check mark on the selected box of the different setting boxes. Further, in response to receiving various setting operations and an operation on the confirmation key 1300 by the receiving unit 32, the various setting operations are confirmed.

As described in step S6 of FIG. 5, the transmitting and receiving unit 31 transmits, to the management server 5, input information including various setting information received by the receiving unit 32.

Figure 7:
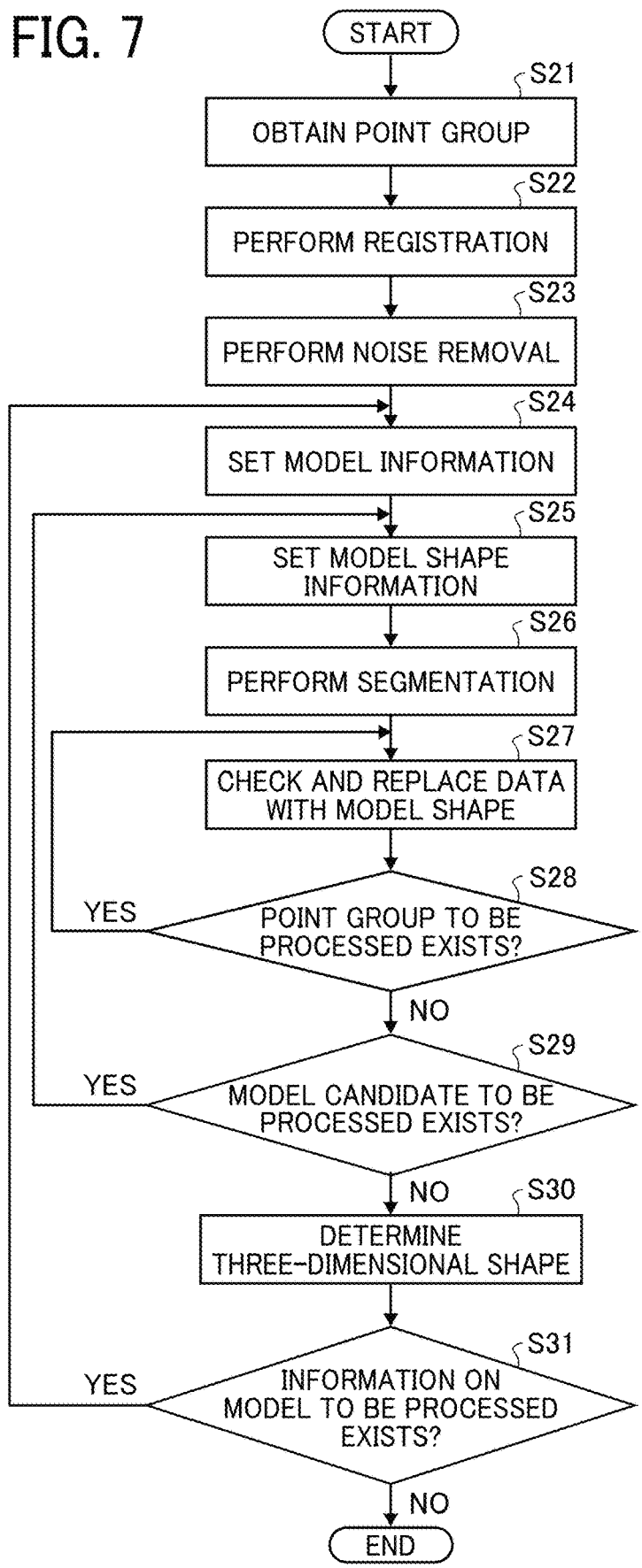
FIG. 7 indicates a flowchart of a process of generating a three-dimensional shape according to an embodiment of the present disclosure.

FIG. 7 is a flowchart of a process of generating a three-dimensional shape according to an embodiment of the present disclosure, which is the process in step S8 of FIG. 5.

The processor 53 of the management server 5 obtains three-dimensional point group data read by the storing and reading unit 59 (step S21) to obtain multiple sets of three-dimensional point group data. When the processing program read by the storing and reading unit 59 includes processing program relating to registration, the processor 53 performs registration processing (step S22). The registration processing (i.e., a point-cloud registration) is a process of transforming multiple three-dimensional point groups into one integrated three-dimensional point group.

When the processing program read by the storing and reading unit 59 includes a processing program relating to noise removal, the processor 53 performs noise removal processing (step S23). The noise removal processing is a process of removing an unnecessary point group from the three-dimensional point groups.

The setting unit 57 of the management server 5 sets model information based on the model setting information included in the input information received in step S6 of FIG. 5 (step S24). For example, as illustrated in FIG. 6, when the model setting information includes the model information indicating the three-dimensional model shape of pipe and the model information indicating the three-dimensional model shape of desk, the setting unit 57 first sets the model information indicating the three-dimensional model shape of piping.

The setting unit 57 sets one or multiple sets of model shape information based on the model setting information included in the input information received in step S6 of FIG. 5 (step S25). For example, as illustrated in FIG. 6, when the model setting information includes the model shape information indicating the three-dimensional model shape of the model A of piping and the model shape information indicating the three-dimensional model shape of the model B of piping, the setting unit 57 first sets the model shape information indicating the three-dimensional model shape of the model A of piping.

When the processing programs read by the storing and reading unit 59 includes processing program relating to segmentation, processor 53 performs a segmentation process (step S26). The segmentation process is a process of labeling a particular point group in the three-dimensional point groups to distinguish the particular point group from the other point groups. In one example, the segmentation processing involves labeling multiple particular point groups differently from each other to allow the multiple particular point groups to be distinguished from one another. In another example, the segmentation process may be performed together with a clustering process of grouping point groups which are close to each other among the labeled point groups.

The processor 53 collates the point group labeled in step S26 with each of the multiple three-dimensional model shapes included in the model shape information set in step S25 and performs a replacement process on a particular area using a closest three-dimensional model shape (step S27). When no optimum model shape is present among the multiple three-dimensional model shapes, the processor 53 may adjust the size and shape of the model shape. When there is a possibility that texture information is different in the same shape, collating may be performed on models including models including models having the same shape but different textures. Further, the processor 53 may skip the segmentation process in step S26 and perform step S27 after step S25.

The determination unit 55 of the management server 5 determines whether a point group on which the displacement process included in step S27 is not performed yet (i.e., a point group to be processed) is present. When the determination unit 55 determines that a point group to be processed is present (YES in step S28), the process returns to step S27. Then, the processor 53 performs the replacement process on a particular area using a three-dimensional shape. In one example, when the ratio of a point group to be processed with respect to all the point groups is equal to or less than a predetermined value, the determination unit 55 may determine that a point group to be processed is not present, i.e., the process on the point groups is completed. The predetermined value is a value set by the user in advance.

When the determination unit 55 determines that a point group to be processed is not present (NO in step S28), the process proceeds to step S29. In step S29, the determination unit 55 determines whether there is any model candidate to be processed (a model candidate on which the processes are not performed yet) (step S29). When the determination unit 55 determines that a model candidate to be processed is present (YES in step S29), the process returns to step S25. In step S25, the setting unit 57 sets model shape information for the model candidate to be processed. For example, the setting unit 57 sets, as multiple model candidates, sets model shape information indicating the three-dimensional model shape of the model B of piping after setting the model shape information indicating the three-dimensional model shape of the model A of piping.

When the determination unit 55 determines that a model candidate to be processed is not present (NO in step S29), the processor 53 determines the three-dimensional shape information based on the shape setting information included in the input information received in step S11 of FIG. 5 (step S30). For example, the setting unit 57 determines, as the three-dimensional shape information, one of the three-dimensional shape information generated based on the model shape information of the model A of piping and the three-dimensional shape information generated based on the model shape information of the model B of piping.

The determination unit 55 determines whether there is any model information to be processed (i.e., whether model information on which the processes are not processed yet) (step S31). When the determination unit 55 determines that no model information to be processed is present (NO in step S31), the process ends.

When the determination unit 55 determines that model information to be processed is present (YES in step S31), the process returns to step S24. In step S24, the setting unit 57 sets model shape information to be processed. For example, the setting unit 57 sets model information of the desk after setting the model information of piping.

FIG. 8 is an illustration of the registration process according to an embodiment of the present disclosure.

Figure 8B:
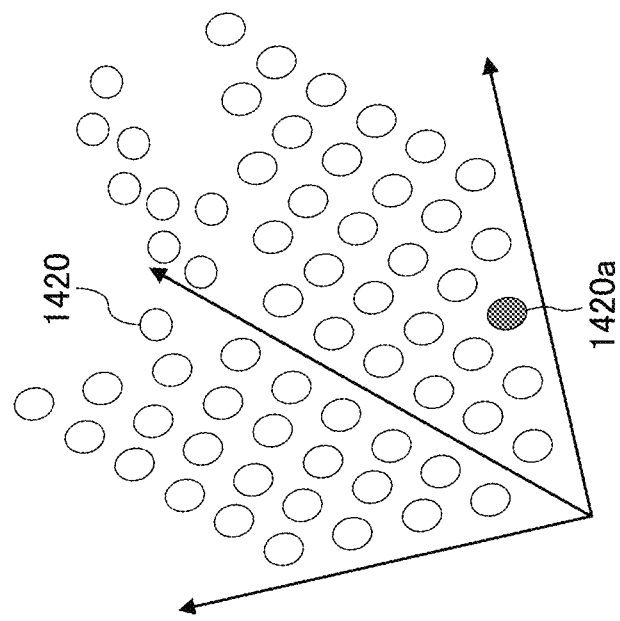
FIGS. 8A and 8B are illustrations of a registration process according to an embodiment of the present disclosure.
Figure 8A:
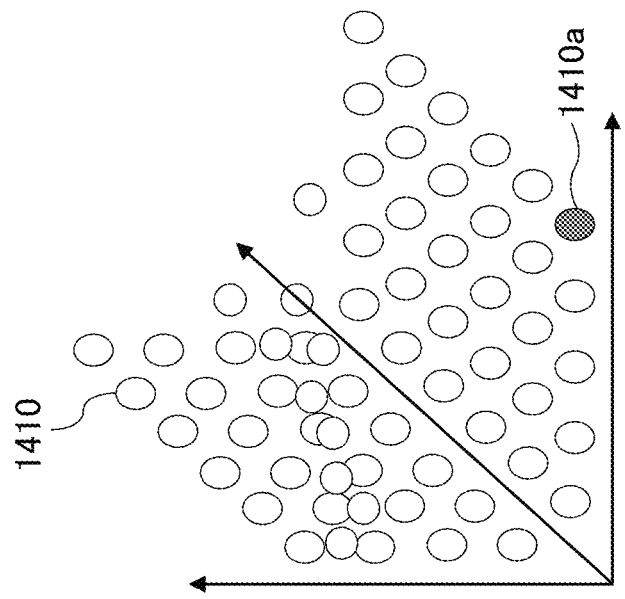

FIG. 8A is an illustration of first three-dimensional point groups 1410. FIG. 8B is an illustration of second three-dimensional point groups 1420.

The processor 53 transforms the first three-dimensional point groups 1410 and the second three-dimensional point groups 1420 into one integrated three-dimensional point group by aligning a feature point 1410a included in the first three-dimensional point groups 1410 and a feature point 1420a included in the second three dimensional point groups 1420.

Figure 9:
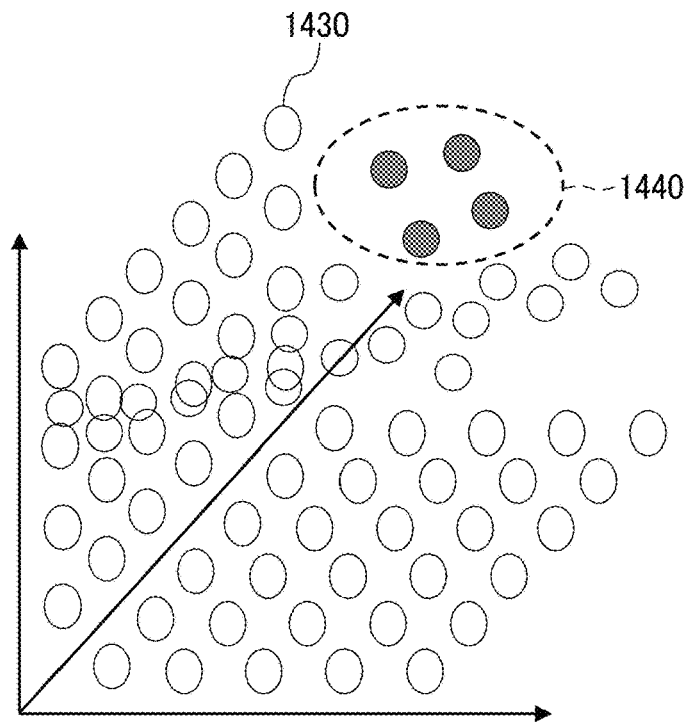
FIG. 9 is an illustration of a noise removal process according to an embodiment of the present disclosure.

FIG. 9 is an illustration of a noise removal process according to an embodiment of the present disclosure. The processor 53 removes unnecessary point groups 1440 from three-dimensional point groups 1430.

Figure 10:
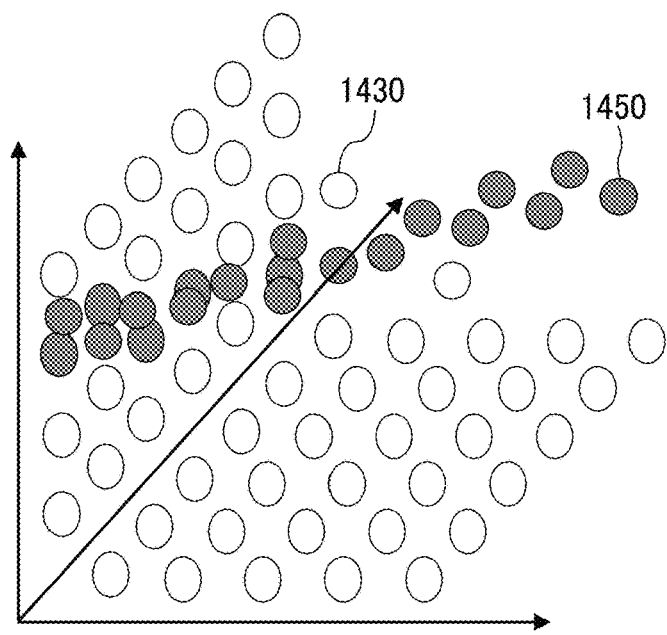
FIG. 10 is an illustration of a segmentation processing according to an embodiment of the present disclosure.

FIG. 10 is an illustration of a segmentation processing according to an embodiment of the present disclosure.

The processor 53 labels particular point groups in the three-dimensional point groups 1430 to form labeled point groups 1450 (black dots) so as to allow the labeled point groups to be distinguished from the other point groups.

FIGS. 11A, 11B, and 11C are illustrations of a model collation and replacement process according to an embodiment of the present disclosure.

FIG. 11A is an illustration of three-dimensional point groups 1430. FIG. 11B is an illustration of a model candidate 1460 of piping A. FIG. 11C is an illustration of a model candidate 1470 of piping B.

The model candidate 1460 of piping A includes multiple model shapes 1461, 1462, and 1463 each having a different shape. The model candidate 1470 of piping B includes multiple model shapes 1471, 1472, and 1473 each having a different shape.

The processor 53 collates the labeled point groups 1450 (a point group of black dots) with each of the multiple model shapes of piping A 1461, 1462, and 1463, and replaces a particular region with a closest model shape. In one example, when an optimum model shape is not included in the multiple model shapes 1461, 1462, and 1463, the processor 53 adjusts the dimension and shape of the model shapes. In the present disclosure, the processor 53 calculates a distance between points of the model shape and the point groups and determines, as the closest shape model, a model shape for which the sum of distances between the model shape and the point groups is smallest among multiple model shapes. When there is a possibility that texture information is different in the same shape, collating may be performed on models having the same shape but different textures (or multiple textures) and different materials (or multiple materials). For example, the colors (RGB) of the point groups are compared with the colors of the texture included in the model shape information to set the closest color. Specifically, the closest color is determined based on the sum of absolute values of differences between the color information (RGB) of the texture and the RGB values of the point group for each point of the point group. The color of the point group is compared with the color of the texture included in the model shape information using any comparing method.

The processor 53 collates the labeled point groups 1450 (point groups of black dots) with each of the multiple model shapes of piping B 1471, 1472, and 1473, and replaces a particular region with a closest model shape that is closest to the shape of the labeled point groups 1450 among the multiple model shapes 1471, 1472, and 1473. When no optimum model shape is present among the multiple three-dimensional model shapes, the processor 53 may adjust the size and shape of the model shape. In one example, when an optimum model shape is not included in the multiple model shapes 1471, 1472, and 1473, the processor 53 adjusts the dimension and shape of the model shapes.

FIG. 12 is an illustration of an operation screen according to an embodiment of the present disclosure.

FIG. 12 illustrates a display screen 1000, which is displayed on the display 308 of the terminal device 3 in step S10 of the sequence diagram in FIG. 5.

The display control unit 34 of the communication terminal displays a generated shape setting screen 1500, a generated shape display screen 1600, and a confirmation key 1300 on the display screen 1000.

The generated shape setting screen 1500 serves as a second reception screen that receives a shape setting operation for setting one three-dimensional shape information from multiple sets of three-dimensional shape information. The generated shape setting screen 1500 includes generated shape setting boxes 1510 and 1520.

The generated shape setting box 1510 is used to set a three-dimensional shape generated based on the model shape information of the model A of piping. The generated shape setting box 1520 is used to set a three-dimensional shape generated based on the model shape information of the model B of piping.

The display control unit 34 causes the generated shape display screen 1600 to display generated shapes 1610 and 1620 in association with the names of multiple sets of model shape information.

The generated shape 1610 indicates a three-dimensional shape generated based on the model shape information of the model A of piping. The generated shape 1620 indicates a three-dimensional shape generated based on the model shape information of the model B of piping.

The receiving unit 32 of the communication terminal receives the shape setting operation in response to receiving a user's operation, i.e., the user's pointing at the generated shape setting box 1510 or 1520 with a pointing device such as the mouse 312. The receiving unit 32 confirms the shape setting operation in response to a user's operation on the confirmation key 1300.

As described in step S11 of FIG. 5, the transmitting and receiving unit 31 transmits, to the management server 5, input information including shape setting information received based the shape setting operation received by the receiving unit 32. In FIG. 12, one of the generated shape 1610 and the generated shape 1620 is selected based on the operation of the user. In another example, the processor 53 of the management server 5 automatically selects a generated shape that is closer to the shape of the labeled point group between the generated shape 1610 or 1620, without receiving a user's operation. In the present disclosure, the processor 53 calculates a distance between points of the generated shape and the point groups and determines, as the "generated shape that is closer to the shape of the labeled point group", a generated shape for which the sum of distance between the generated shape and the point groups is smaller between the generated shape 1610 and the generated shape 1620.

Aspect 1

A management server 5 (an example of a three-dimensional shape generation apparatus) according to an embodiment includes a processor 53 (an example of a three-dimensional information generation unit) configured to generate three-dimensional shape information indicating a three-dimensional shape corresponding to a three-dimensional point group, based on point-group information indicating the three-dimensional point group, using more than one set of model shape information received from a terminal device 3 (an example of a communication terminal) communicable with the management server 5. The more than one set of model shape information have been selected from multiple sets of model shape information by a model setting operation input to a model information setting screen 1230 (an example of a reception screen) of the terminal device 3. The model setting operation is input to the model information setting screen 1230 in the terminal device 3 to select or set more than one set of model shape information from multiple sets of model shape information to generated three-dimensional shape information. In other words, a three-dimensional shape generation apparatus (a management server 5) includes: a transmitting and receiving unit 51 configured to: receive, at a reception screen (a model information setting screen 1230), a model setting operation to set multiple sets of model shape information each indicating a three-dimensional model shape; and a three-dimensional information generation unit (a processor 53) generate three-dimensional shape information indicating a three-dimensional shape corresponding to a three-dimensional point group based on the multiple sets of model shape information set by the model setting operation and point-group information indicating the three-dimensional point group.

Specifically, the processor 53 collates a particular area in the three-dimensional point group with the three-dimensional model shape indicated by the model shape information set by the model setting operation, and performs a replacement process on the particular area using the three-dimensional model shape (i.e., replace the particular area with the three-dimensional model shape).

This configuration allows an appropriate generation of three-dimensional shape information for the three-dimensional point groups.

Collectively generating a three-dimensional shape from all the multiple sets of model shape information might cause less accuracy and longer processing time. Further, generating a three-dimensional shape from a single set of model shape information involves the process of repeatedly generating the three-dimensional shape corresponding to the number of sets of model shape information to be used.

To avoid such situations, an embodiment of the present disclosure enables an appropriate generation of a three-dimensional shape with an accuracy desired by the user, without involving without taking undue processing time or effort.

For example, a skilled person can generate a three-dimensional shape by selecting model shape information to be used, from multiple sets of model shape information whereas a non-skilled person can generate a three-dimensional shape collectively from multiple sets of model shape information. In other words, an embodiment of the present disclosure allows an appropriate generation of a three-dimensional shape according to the skill level of the user.

Aspect 2

In Aspect 2, each of the multiple sets of model shape information includes information indicating the three-dimensional model shape and additional information, and the processor 53 is configured to generate the three-dimensional shape information including the additional information.

Aspect 3

In Aspect 1 or Aspect 2, the management server 5 includes a transmitting and receiving unit 51 as a transmitter configured to transmit reception screen information indicating the model information setting screen 1230 (the reception screen) to the terminal device 3 as a communication terminal communicable with the management server 5.

This enables the management server 5 to generate three-dimensional shape information using the model shape information set by the terminal device 3.

Aspect 4

In Aspect 3, the transmitting and receiving unit 51 transmits multiple sets of model shape information to the terminal device 3 to cause the display 308 as a display unit of the terminal device 3 to display a three-dimensional model shape corresponding to each of the multiple sets of model shape information.

This configuration enables the user to appropriately set the model shape information while checking the three-dimensional model shape displayed on the display 308 of the terminal device 3.

Aspect 5

In Aspect 4, each of the multiple sets of model shape information includes information indicating the three-dimensional model shape and additional information having color or pattern, and the transmitting and receiving unit 51 is further configured to transmit the multiple sets of model shape information to the terminal device 3 to cause the terminal device 3 to display the three-dimensional model shape with the color or the pattern on the display 308.

Aspect 6

In any one of Aspect 1 to Aspect 5, the three-dimensional point group includes multiple three-dimensional point groups, and the processor 53 generates three-dimensional shape information corresponding to a part of point groups in the multiple three-dimensional point groups. Specifically, the processor 53 performs a segmentation process involving labeling a region, which is a part of the three-dimensional point groups, and particular point groups in the three-dimensional point groups so as to distinguish the region, i.e., the particular point groups, from the other point groups of the three-dimensional point groups. This enables an accurate generation of the three-dimensional shape information for the region, which is a part of the three-dimensional point groups.

Aspect 7

In any one of Aspect 1 to Aspect 6, the point group information includes multiple sets of point group information, and the processor 53 generates three-dimensional shape information based on the multiple sets of point group information 1410 and 1420. Specifically, the processor 53 performs a registration process for aligning multiple sets of point group information 1410 and 1420 indicating multiple locations to obtain an integrated point group information (an integrated three-dimensional point group 1430). This enables generation of the three-dimensional shape information for the region extending over multiple locations.

Aspect 8

The multiple sets of model shape information include multiple three-dimensional model shapes having shapes different from each other. The processor 53 generates three-dimensional shape information from the three-dimensional point group, using any one of two or more three-dimensional model shapes 1461, 1462, and 1463. This enables generation of the three-dimensional shape information using the three-dimensional model shape close to the shape of the three-dimensional point group.

Specifically, the processor 53 collates a particular area in the three-dimensional point group with each of the two or more model shapes 1461, 1462, and 1463, and replaces the particular area with the three-dimensional model shape information indicating a three-dimensional model shape closest to the shape of the particular area among the multiple three-dimensional model shapes 1461, 1462, and 1463.

Aspect 9

In any one of Aspect 1 to Aspect 8, the multiple sets of model shape information include multiple sets of three-dimensional shape information. The multiple sets of model shape information include multiple model candidates 1460 and 1470 indicating three-dimensional model shapes having shapes different from each other. The processor 53 generates multiple sets of three-dimensional shape information for an area common between the multiple model candidates 1460 and 1470 within the three-dimensional point group, using each of the multiple model candidates 1460 and 1470. This configuration enables generation of two or more sets of three-dimensional shape information indicating three-dimensional model shapes different from each other, which are intended to be candidates for the three-dimensional shape information obtained from the particular area within the three-dimensional point group.

Aspect 10

In Aspect 9, the model setting operation sets at least one of the multiple model candidates 1242 and 1243. The processor 53 generates three-dimensional shape information using said at least one of the multiple model candidates set by the model operation. Such setting of model candidates enables narrowing down of the candidates for the three-dimensional shape information obtained from the particular area within the three-dimensional point groups.

Aspect 11

In Aspect 9 or 10, based on a shape setting operation received by the generated shape setting screen 1500 as a second reception screen (another reception screen) that receives the shape setting operation for setting one set of three-dimensional shape information from among multiple sets of three-dimensional shape information, the processor 53 determines three-dimensional shape information set by the shape setting operation. In other words, the three-dimensional shape information includes multiple sets of three-dimensional shape information, and the three-dimensional information generation unit (the processor 53) is further configured to receives, at another reception screen, a shape setting operation to set one set of the three-dimensional shape information from the multiple sets of three-dimensional shape information, determines said one set of the three-dimensional shape information set by the shape setting operation as the three-dimensional shape information. In the three-dimensional shape generation apparatus according to Aspect 9 or 10, the three-dimensional shape information includes multiple sets of three-dimensional shape information. The three-dimensional information generation unit (53) is further configured to: generate another reception screen to receive, a shape setting operation to set one set of the three-dimensional shape information; and determine said one set of the three-dimensional shape information set by the shape setting operation as the three-dimensional shape information.

This configuration enables determination of the three-dimensional shape information obtained from the particular area within the three-dimensional point groups, from among multiple candidates.

Aspect 12

In Aspect 11, the management server 5 includes a storing and reading unit 59 serving as a storage controller and a memory (a setting information management DB 5001). The storing and reading unit 59 (the storage controller) store, in the setting information management DB 5001, the model shape information corresponding to the one set of three-dimensional shape information set by the shape setting operation. The processor 53 generates three-dimensional shape information based on another set of point group information indicating another three-dimensional point group, using the model shape information stored in the setting information management DB 5001.

This configuration enables generation of three-dimensional shape information based on another set of point group information by using the model shape information corresponding to the determined three-dimensional shape information.

Aspect 13

In Aspect 11 or 12, the management server 5 includes a transmitting and receiving unit 51 that transmits second reception screen information (another set of reception screen information) indicating a generation shape setting screen 1500 (another reception screen) to the terminal device 3 communicable with the management server 5.

This enables the management server 5 to determine one set of three-dimensional shape information from multiple sets of three-dimensional shape information based on the shape setting operation input to the terminal device 3.

Aspect 14

In Aspect 13, the transmitting and receiving unit 51 transmits the multiple sets of three-dimensional shape information to the terminal device 3 to cause the terminal device 3 to display a three-dimensional shape corresponding to each of the multiple sets of three-dimensional shape information on a display 308 serving as a display or a screen.

This configuration enables the user to appropriately set the three-dimensional shape information while checking the three-dimensional shape displayed on the display 308 of the terminal device 3.

Aspect 15

In any one of Aspect 1 to Aspect 14, the management server 5 further includes a storing and reading unit 59 serving as a storage controller that stores the three-dimensional shape information in a storage unit (or a memory) such as the three-dimensional shape management DB 5004, the recording medium 506, or the CD-RW 513.

Aspect 16

In any one of Aspect 1 to Aspect 15, the transmitting and receiving unit 51 transmits the three-dimensional shape information to the terminal device 3. This enables the user of the terminal device 3 to check the three-dimensional shape information on the terminal device 3.

Aspect 17

A three-dimensional shape generation system 1 according to an embodiment of the present disclosure includes: a management server 5 (an example of three-dimensional shape generation apparatus) and a terminal device 3 (communication terminal) communicable with the management server 5. The three-dimensional shape generation system 1 further includes a transmitter (the transmitting and receiving unit 51), a display control unit 34, a receiver (the receiving unit 32), and a three-dimensional information generation unit (the processor 53). The transmitter (the transmitting and receiving unit) 51 transmit reception screen information indicating a reception screen (the model information setting screen 1230) to the communication terminal (the terminal device 3). The display control unit 34 causes the terminal device 3 to display the reception screen based on the reception screen information transmitted to the terminal device 3. The receiving unit 32 receives, at a reception screen (1230), a model setting operation to set multiple sets of model shape information each indicating a three-dimensional model shape. The three-dimensional information generation unit (the processor 53) generates three-dimensional information indicating a three-dimensional shape corresponding to a three-dimensional point group based on the multiple sets of model shape information set by the model setting operation and point-group information indicating the three-dimensional point group. The transmitter (the transmitting and receiving unit 51) and the three-dimensional shape information generation unit (the processor 53) are included in the three-dimensional shape generation apparatus (the management server 5). The display control unit 34 and the receiver (the receiving unit 32) are included in the communication terminal (the terminal device 3). A three-dimensional shape generation system 1 includes: a three-dimensional shape generation apparatus comprising first circuitry (501); and a communication terminal comprising second circuitry (301). The communication terminal communicable with the three-dimensional shape generation apparatus. The first circuitry (501) is configured to: transmit reception screen information indicating a reception screen to the communication terminal. The second circuitry (301) configured to: display the reception screen, to receive a model setting operation, based on the reception screen information transmitted to the communication terminal; and receive the model setting operation to set multiple sets of model shape information each indicating a three-dimensional model shape. The first circuitry (501) is further configured to: generate three-dimensional information indicating a three-dimensional shape corresponding to a three-dimensional point group based on the multiple sets of model shape information set by the model setting operation and point-group information indicating the three-dimensional point group.

Aspect 18

A three-dimensional shape generating method according to an embodiment includes: generating a reception screen to receive a model setting operation to set multiple sets of model shape information each indicating a three-dimensional model shape (S3); transmitting reception screen information indicating a reception screen (a model information setting screen 1230) (S4); receiving a model setting operation to set multiple sets of model shape information each indicating a three-dimensional model shape (S6); and three-dimensional shape information indicating a three-dimensional shape corresponding to a three-dimensional point group based on the multiple sets of model shape information set by the model setting operation and point-group information indicating the three-dimensional point group (S8). The model setting operation of the model setting information received (S6) has been received at the reception screen.

Aspect 19

A three-dimensional shape generating method according to another embodiment includes: receiving a model setting operation to set multiple sets of model shape information each indicating a three-dimensional model shape (S6); and generating three-dimensional shape information indicating a three-dimensional shape corresponding to a three-dimensional point group based on the multiple sets of model shape information set by the model setting operation and point-group information indicating the three-dimensional point group (S8).

Aspect 20

A non-transitory recording medium storing a program according to an embodiment of the present disclosure causes a computer to execute the above-described three-dimensional shape generation method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A three-dimensional shape generation apparatus comprising:
a memory; and
circuitry configured to:
generate three-dimensional shape information indicating a three-dimensional shape corresponding to a three-dimensional point group based on multiple sets of model shape information set by a model setting operation and point-group information indicating the three-dimensional point group, wherein
the model setting operation received at a reception screen sets the multiple sets of model shape information each indicating a three-dimensional model shape,
the multiple sets of model shape information include:
a first model shape information; and
a second model shape information, a type of target object of the second model shape information being different from a type of target object of the first model shape information,
the reception screen displays a name of model information indicating a three-dimensional model shape of the target object of the first model shape information in association with a first setting box that sets the first model shape information,
the reception screen displays a name of model information indicating a three-dimensional model shape of the target object of the second model shape information in association with a second setting box that sets the second model shape information, and
the circuitry is further configured to:
generate first three-dimensional shape information based on the first model shape information and the point-group information;
generate second three-dimensional shape information based on the second model shape information and remaining point-group information of the point-group information not used for generating the first three-dimensional shape information; and
store the first three-dimensional shape information and the second three-dimensional shape information in the memory.

2. The three-dimensional shape generation apparatus according to claim 1, wherein
each of the multiple sets of model shape information includes information indicating the three-dimensional model shape and additional information, and
the circuitry generates the three-dimensional shape information including the additional information.

3. The three-dimensional shape generation apparatus according to claim 1, wherein the circuitry is further configured to transmit reception screen information indicating the reception screen to a communication terminal communicable with the three-dimensional shape generation apparatus.

4. The three-dimensional shape generation apparatus according to claim 3, wherein the circuitry is further configured to transmit the multiple sets of model shape information to the communication terminal to display the three-dimensional model shape corresponding to each of the multiple sets of model shape information on a display of the communication terminal.

5. The three-dimensional shape generation apparatus according to claim 4, wherein
each of the multiple sets of model shape information includes information indicating the three-dimensional model shape and additional information having color or pattern, and
the circuitry is further configured to transmit the multiple sets of model shape information to the communication terminal to cause the communication terminal to display the three-dimensional model shape with the color or the pattern on the display.

6. The three-dimensional shape generation apparatus according to claim 1, wherein
the three-dimensional point group includes multiple three-dimensional point groups, and
the circuitry is configured to generate the three-dimensional shape information corresponding to a part of point groups in the multiple three-dimensional point groups.

7. The three-dimensional shape generation apparatus according to claim 1, wherein
the three-dimensional point group includes multiple three-dimensional point groups, and
the circuitry is configured to generate the three-dimensional shape information corresponding to some point groups of the multiple three-dimensional point groups.

8. The three-dimensional shape generation apparatus according to claim 1, wherein
the multiple sets of model shape information include multiple three-dimensional model shapes having shapes different from each other, and
the circuitry is configured to generate the three-dimensional shape information from the three-dimensional point group using any one of the multiple sets of model shape information.

9. The three-dimensional shape generation apparatus according to claim 1, wherein
the three-dimensional shape information includes multiple sets of three-dimensional shape information,
the multiple sets of model shape information include multiple model candidates indicating three-dimensional model shapes having shapes different from each other, and
the circuitry is configured to generate the multiple sets of three-dimensional shape information for an area common between the multiple model candidates within the three-dimensional point group using each of the multiple model candidates.

10. The three-dimensional shape generation apparatus according to claim 9, wherein
the model setting operation sets at least one of the multiple model candidates, and
the circuitry is configured to generate the three-dimensional shape information using said at least one of the multiple model candidates set by the model setting operation.

11. The three-dimensional shape generation apparatus according to claim 1, wherein
the three-dimensional shape information includes multiple sets of three-dimensional shape information, and
the circuitry is configured to:
generate another reception screen to receive a shape setting operation to set one set of the three-dimensional shape information from the multiple sets of three-dimensional shape information, and
determine said one set of the three-dimensional shape information set by the shape setting operation as the three-dimensional shape information.

12. The three-dimensional shape generation apparatus according to claim 11,
wherein the circuitry is further configured to:
store, in the memory, the model shape information corresponding to the one set of three-dimensional shape information set by the shape setting operation; and
generate the three-dimensional shape information based on another set of point-group information indicating another three-dimensional point group using the model shape information stored in the memory.

13. The three-dimensional shape generation apparatus according to claim 11, wherein the circuitry is further configured to transmit another set of reception screen information indicating said another reception screen to the communication terminal.

14. The three-dimensional shape generation apparatus according to claim 13, wherein the circuitry is further configured to transmit the multiple sets of three-dimensional shape information to the communication terminal to cause the communication terminal to display the three-dimensional shape corresponding to each of the multiple sets of three-dimensional shape information on a screen in the communication terminal.

15. The three-dimensional shape generation apparatus according to claim 1, wherein the circuitry is further configured to transmit the three-dimensional shape information to the communication terminal.

16. A three-dimensional shape generation system comprising:
a three-dimensional shape generation apparatus comprising a memory and first circuitry; and
a communication terminal comprising second circuitry, the communication terminal communicable with the three-dimensional shape generation apparatus, wherein
the first circuitry is configured to:
transmit reception screen information indicating a reception screen to the communication terminal;
the second circuitry configured to:
display the reception screen, to receive a model setting operation, based on the reception screen information transmitted to the communication terminal; and
receive the model setting operation to set multiple sets of model shape information each indicating a three-dimensional model shape;
the first circuitry is further configured to:
generate three-dimensional information indicating a three-dimensional shape corresponding to a three-dimensional point group based on the multiple sets of model shape information set by the model setting operation and point-group information indicating the three-dimensional point group;
the multiple sets of model shape information include:
a first model shape information; and
a second model shape information, a type of target object of the second model shape information being different from a type of target object of the first model shape information;
the reception screen displays a name of model information indicating a three-dimensional model shape of the target object of the first model shape information in association with a first setting box that sets the first model shape information;
the reception screen displays a name of model information indicating a three-dimensional model shape of the target object of the second model shape information in association with a second setting box that sets the second model shape information; and
the first circuitry is further configured to:
generate first three-dimensional shape information based on the first model shape information and the point-group information; and
generate second three-dimensional shape information based on the second model shape information and remaining point-group information of the point-group information not used for generating the first three-dimensional shape information.

17. A three-dimensional shape generating method comprising:
generating a reception screen to receive a model setting operation to set multiple sets of model shape information each indicating a three-dimensional model shape; and
generating three-dimensional shape information indicating a three-dimensional shape corresponding to a three-dimensional point group based on the multiple sets of model shape information set by the model setting operation and point-group information indicating the three-dimensional point group, wherein
the multiple sets of model shape information include:
a first model shape information; and
a second model shape information, a type of target object of the second model shape information being different from a type of target object of the first model shape information,
the reception screen displays a name of model information indicating a three-dimensional model shape of the target object of the first model shape information in association with a first setting box that sets the first model shape information,
the reception screen displays a name of model information indicating a three-dimensional model shape of the target object of the second model shape information in association with a second setting box that sets the second model shape information, and the method further comprises:

generating first three-dimensional shape information based on the first model shape information and the point-group information;

generating second three-dimensional shape information based on the second model shape information and remaining point-group information of the point-group information not used for generating the first three-dimensional shape information; and storing the first three-dimensional shape information and the second three-dimensional shape information in a memory.

18. The three-dimensional shape generating method according to claim 17, further comprising:

transmitting reception screen information indicating the reception screen, wherein the model setting operation is received at the reception screen.

19. A non-transitory recording medium storing multiple instructions executable by one or more processors to cause the one or more processors to perform the method according to claim 17.

* * * * *